Feb. 23, 1926.

M. GOLDSMITH

INTERNAL COMBUSTION ENGINE

Filed Oct. 13, 1921   7 Sheets—Sheet 1

1,574,244

Inventor
Manning Goldsmith

By C. H. Parker

Attorney

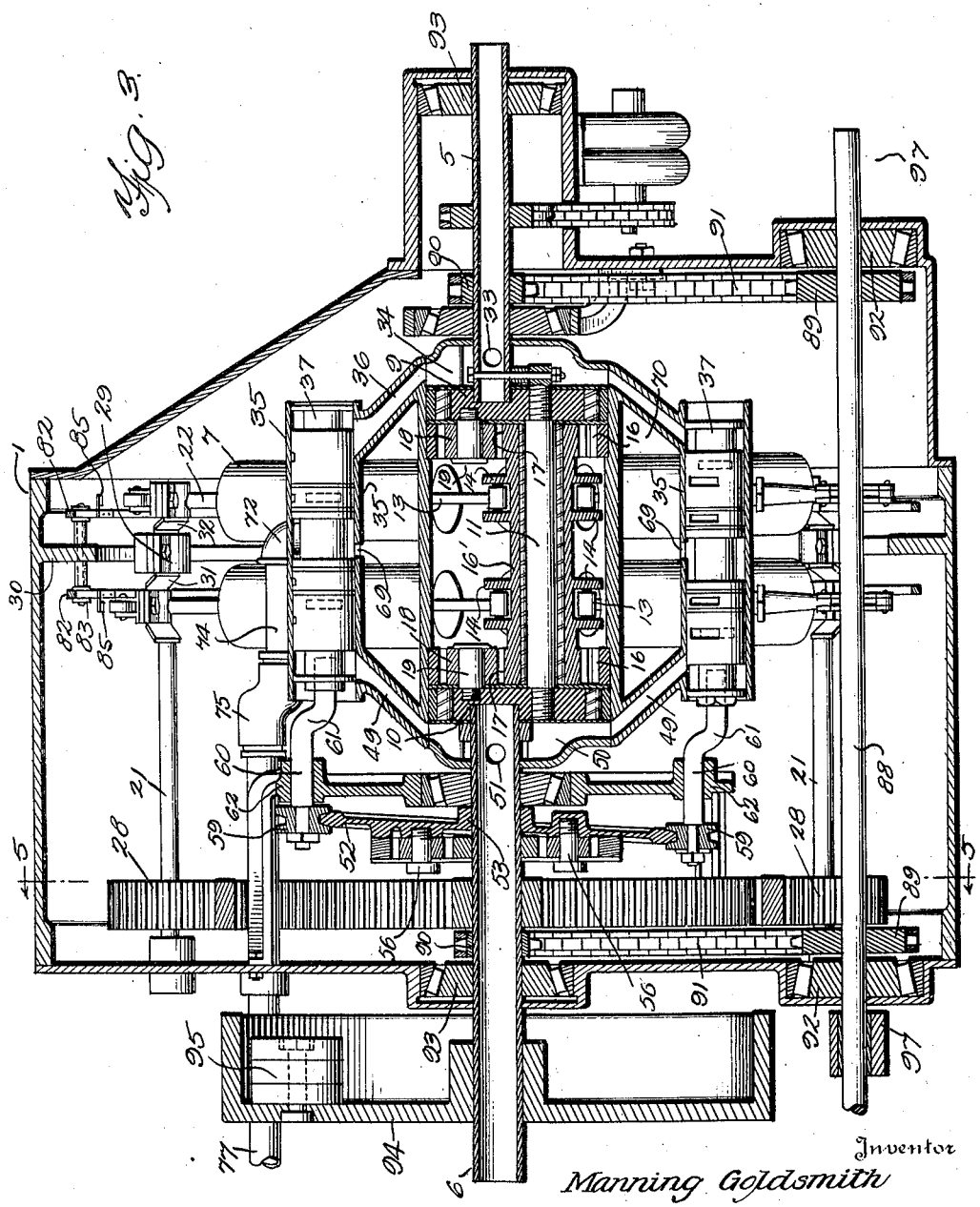

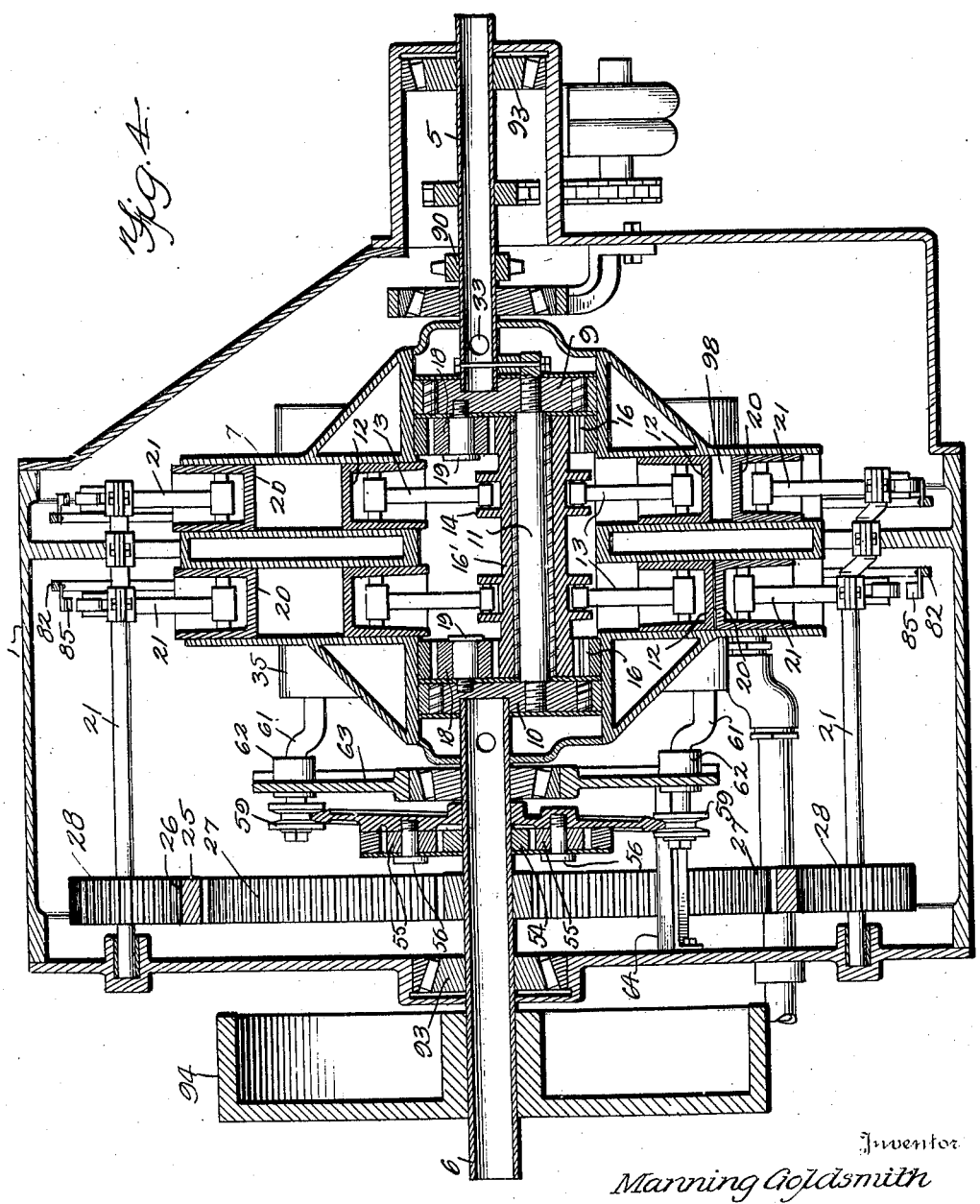

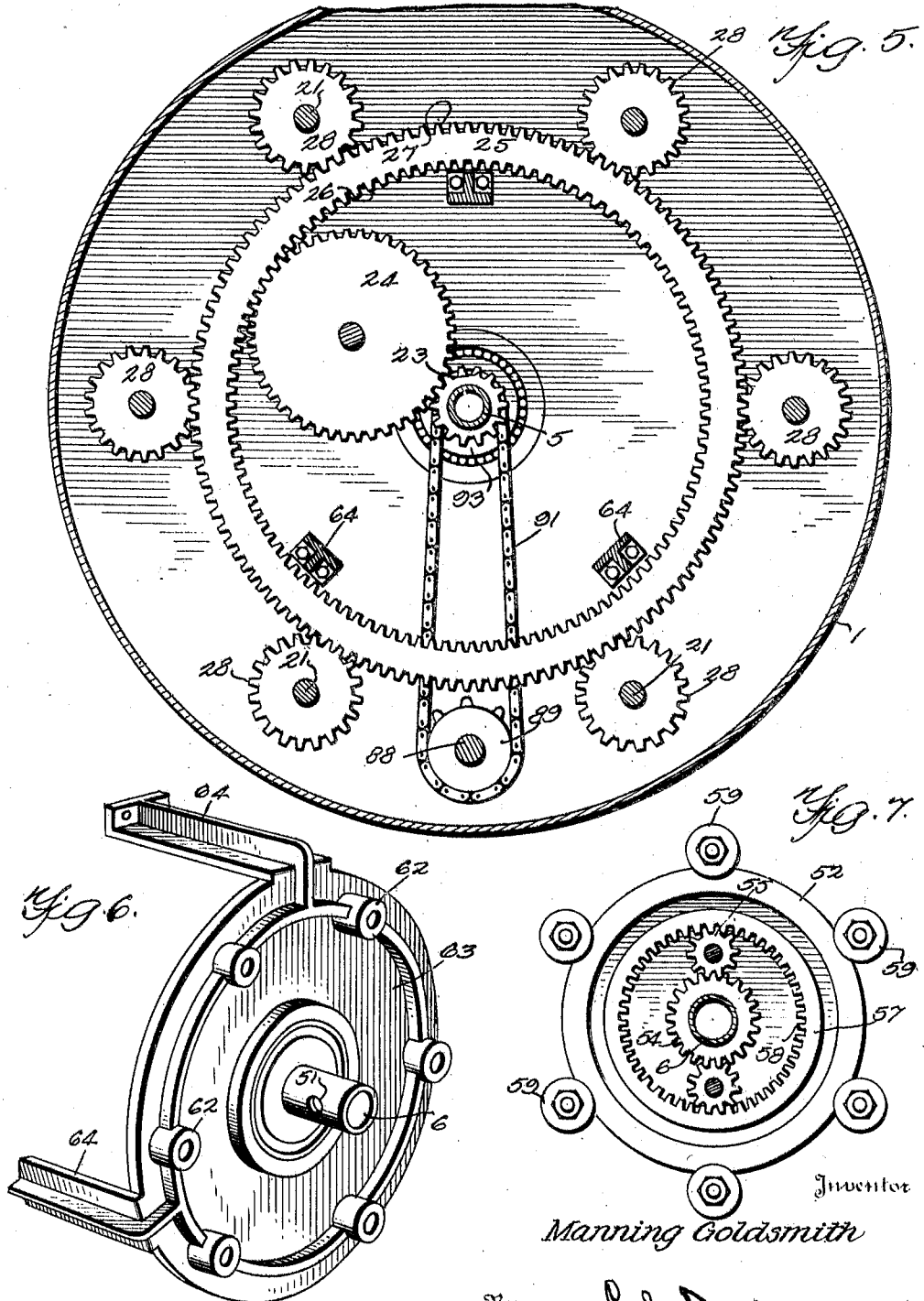

Feb. 23, 1926.

M. GOLDSMITH

INTERNAL COMBUSTION ENGINE

Filed Oct. 13, 1921   7 Sheets-Sheet 5

1,574,244

Inventor
Manning Goldsmith

By [signature]
Attorney

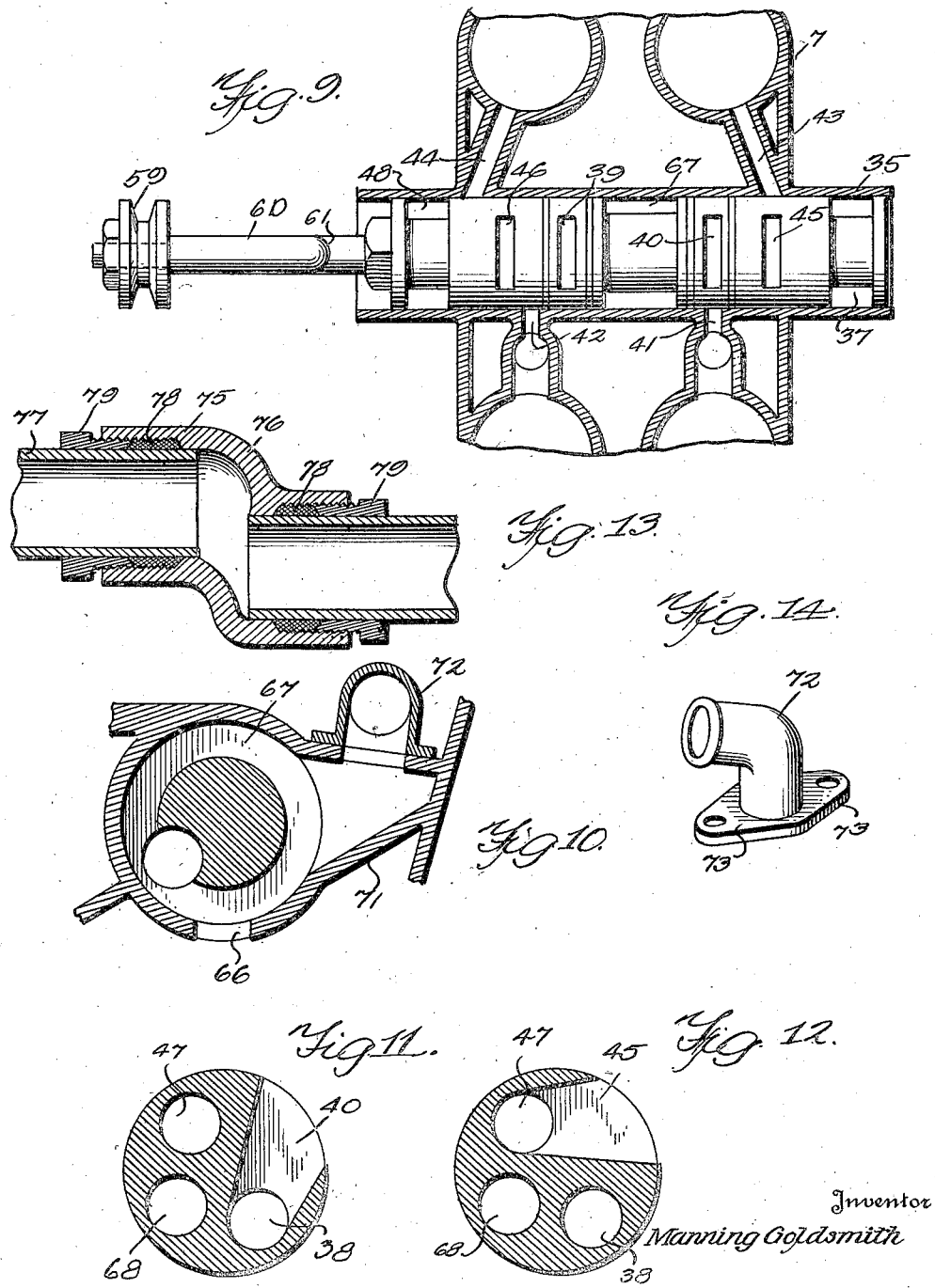

Feb. 23, 1926.

M. GOLDSMITH 1,574,244

INTERNAL COMBUSTION ENGINE

Filed Oct. 13, 1921   7 Sheets-Sheet 7

Inventor

Manning Goldsmith

By  Ch. Parkin

Attorney

Patented Feb. 23, 1926.

1,574,244

UNITED STATES PATENT OFFICE.

MANNING GOLDSMITH, OF ATLANTA, GEORGIA

INTERNAL-COMBUSTION ENGINE.

Application filed October 13, 1921. Serial No. 507,433.

*To all whom it may concern:*

Be it known that I, MANNING GOLDSMITH, a citizen of the United States, residing at Atlanta, in the county of Fulton and State of Georgia, have invented certain new and useful Improvements in Internal-Combustion Engines, of which the following is a specification.

This invention relates to internal combustion engines and more particularly to an engine having a main shaft and a plurality of cylinders arranged in circular formation and disposed eccentrically to the main shaft, each of said cylinders having an inner and outer piston arranged therein.

The present application is a continuation, in part, of my copending application, Serial No. 357,906, filed February 11, 1920, allowed August 13, 1920 and forfeited.

In the said copending application there is disclosed an engine having a plurality of cylinders disposed eccentrically to the main shaft and adapted to travel through orbits, such movements being caused by their excentric mounting, each of the cylinders being provided with inner and outer pistons and valves to control the inlet and exhaust from said cylinders, each of said valves being adapted to control the operation of two cylinders.

The present invention is an improvement over the copending application in the provision of cooling means so arranged that the cooling fluid passes through each of the valves.

In the present invention I further provide a more positive connection between the connecting rods of the inner pistons and the crank shaft to which they are connected.

By providing an engine in which the cylinders are arranged eccentrically of the main shaft an increased efficiency is obtained and smoother running qualities result than from the ordinary type of reciprocating engine.

A reciprocating engine having a connecting rod of three to ten times the length of the crank causes a considerable loss in efficiency due to the angularity of the connecting rod with the crank. In the present invention there is no rod of appreciable length and the drive is the mechanical equivalent of reciprocating parts of unappreciable length. A further advantage of the present construction is that complete scavenging is effected mechanically with resultant increased pressure due to freedom from carbonization. The provision of an engine including rotating parts which are effectively counterbalanced permits the motor to be operated at a considerably higher speed than the ordinary motor which is conducive to economy of fuel.

As stated, a single valve is employed to control the operation of a pair of cylinders. The cylinders are arranged in two sets mounted eccentrically of the main shaft and a single, laterally movable valve is adapted to control the inlet and exhaust of the corresponding cylinders of each set. It will be appreciated that this is an important improvement over the ordinary type of engine where a pair of valves are employed for each cylinder, as the number of valves necessary is thus reduced to one-fourth. The valve admits of adjustment similar to Corliss valve gear as to lap and lean.

In the present invention the cylinders are arranged radially of the main shaft and preferably in pairs. The cylinder block is secured to an eccentric which is connected to the main shaft causing movement of each cylinder throughout a circular orbit. This arrangement produces an engine of maximum efficiency as it provides a construction wherein the explosions take place with the connecting rod and crank in the most suitable position for driving the shaft through the connections. The inflow and exhaust of gases from the cylinders are controlled by rotating valves. One valve is arranged to govern the feed and exhaust from each pair of cylinders. Means are provided for imparting rotary motion to the valves to bring the inlet and exhaust ports into registering position at the proper time and means are provided for laterally shifting the valves to control the feed and exhaust of two cylinders.

In the accompanying drawings I have shown one embodiment of the invention. In this showing:

Figure 3 is a transverse sectional view of the engine showing the valves, Figure 4 is a transverse sectional view through the cylinders.

Figure 5 is a vertical sectional view on line 5—5 of Figure 3,

Figure 6 is a detail view of a supporting member,

Figure 7 is an end elevation of the valve shifting mechanism,

Figure 9 is a horizontal sectional view of the valve casing,

Figures 1, 2:
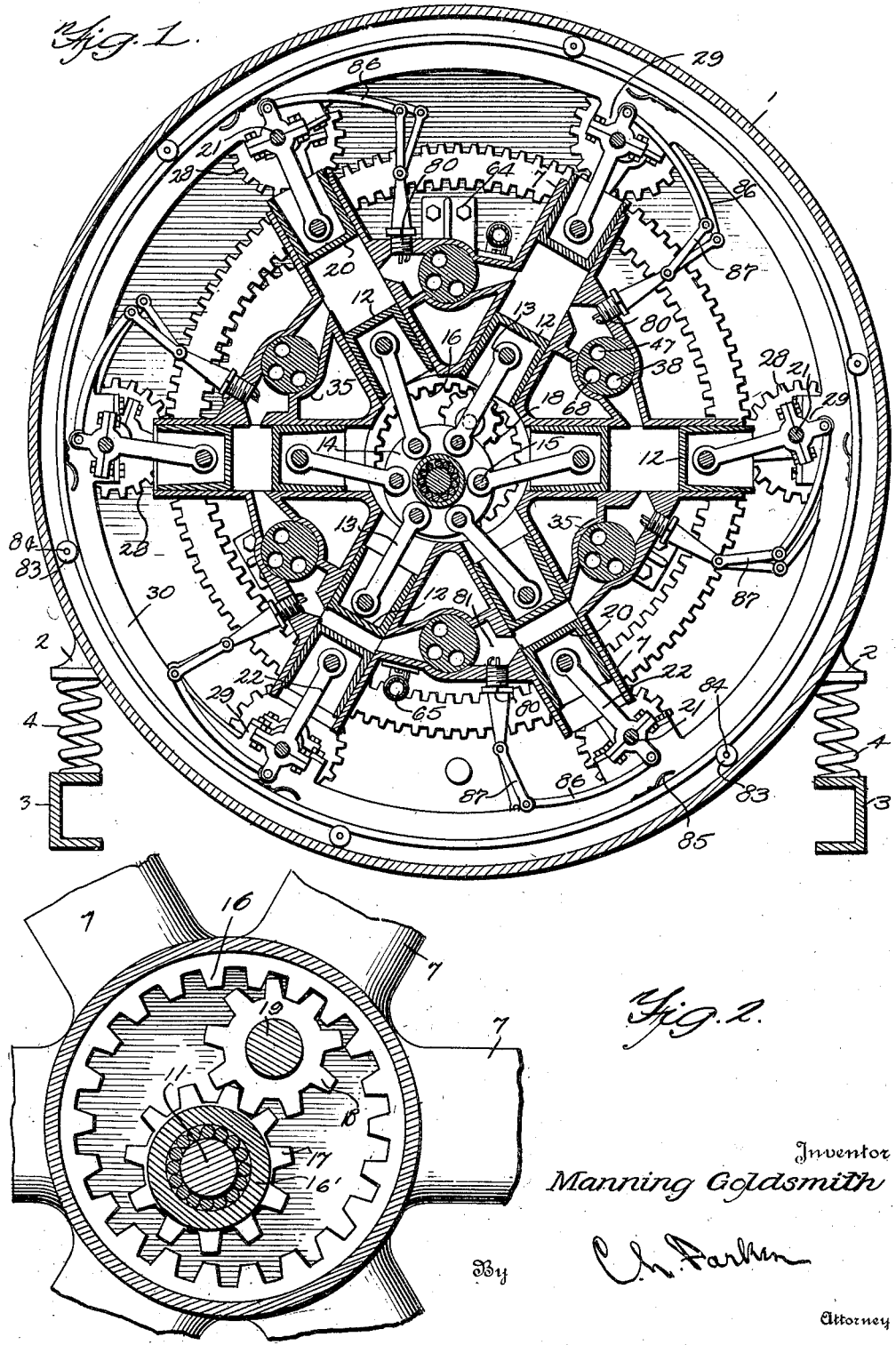
Figure 1 is a vertical sectional view through an engine comprising twelve cylinders arranged in six pairs.
Figure 2 is a similar view of a portion of the engine on an enlarged scale.
Figure 15:
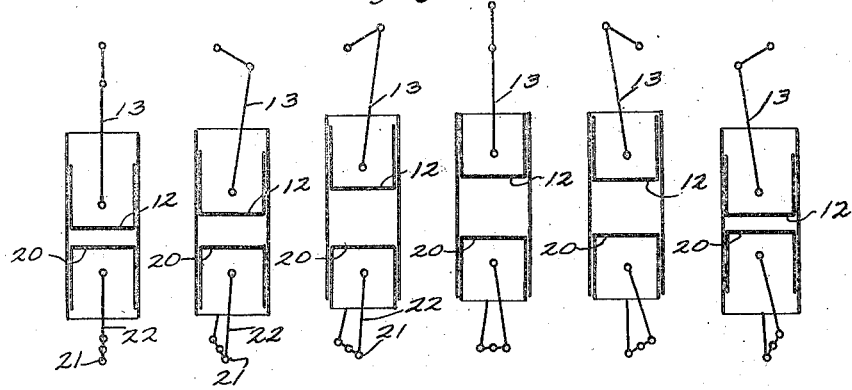
Figure 15A:
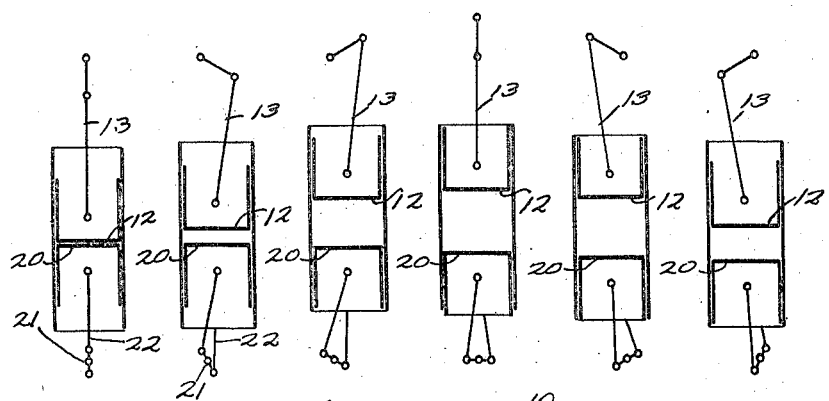
Figure 8:
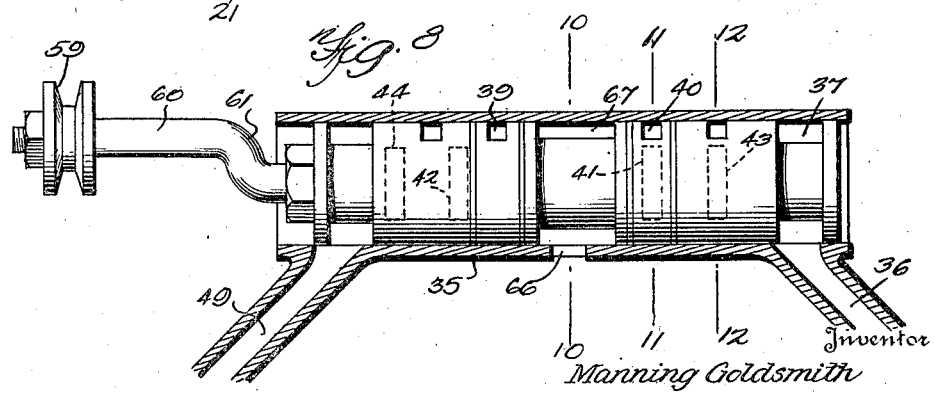
Figure 8 is a vertical sectional view of the valve casing.
Figure 16:
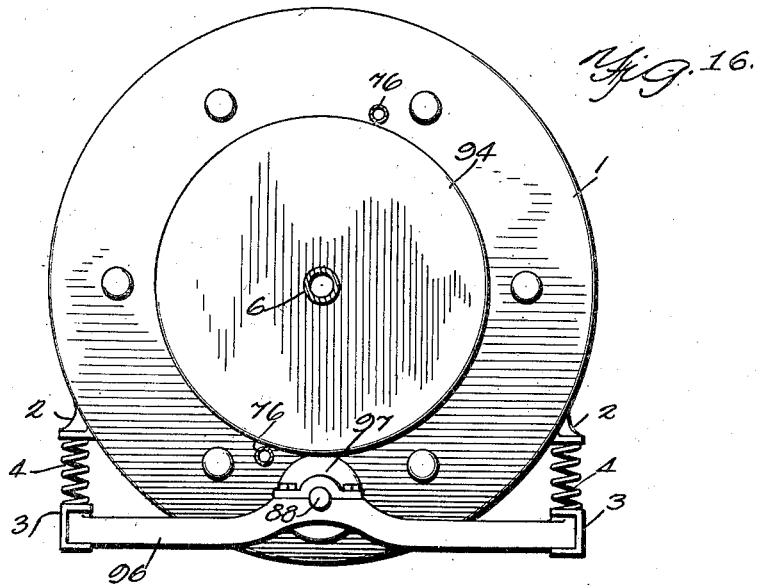
Figure 17:
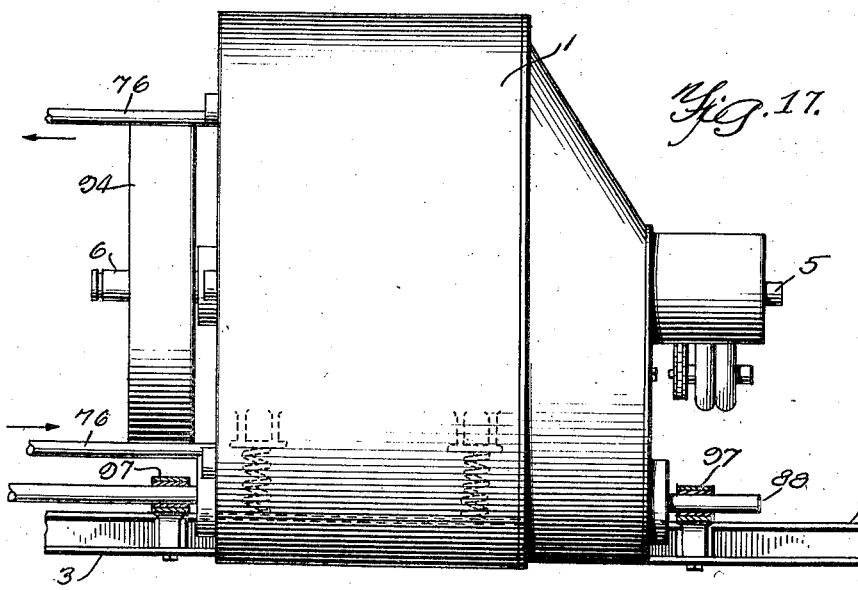

Figure 10 is a transverse vertical sectional view on the line 10—10 of Figure 8, Figure 11 is a similar view on line 11—11 of Figure 8, Figure 12 is a similar view on line 12—12 of Figure 8, Figure 13 is a detail view of one of the connections for the introduction of the cooling medium, Figure 14 is a detail view of a connection between the cooling chamber of the valve chest and the cooling chamber of the motor, Figures 15 and 15ª are diagrammatic illustrations of one cylinder of the engine showing the four cycles of operation, Figure 16 is a side elevation of the engine showing the supporting means, and Figure 17 is an end elevation thereof.

Referring to the drawings, the reference numeral 1 designates a stationary outer casing having supports 2. The engine is mounted on a base 3 by means of compression springs 4 arranged between the base and the supports 2 and adapted to take up shock due to irregularities in the operation of the engine and other causes.

The main shaft consists of two sections 5 and 6 which, as shown, are hollow. The cylinders are preferably cast en bloc and are designated as a whole by the reference numeral 7. Any number of cylinders may be employed. As shown, the engine consists of twelve cylinders, which are arranged in pairs, forming two sets of six cylinders. The six cylinders of each set are arranged radially and each cylinder is disposed adjacent to the corresponding cylinder of the other set. Eccentrics 9 and 10 are mounted in the cylinder block and these two eccentrics are in turn connected to the two sections of the main shaft and revolve with the main shaft. An inner crank shaft 11 is connected to the eccentrics and arranged at a point further removed from the center of the drive shaft than the center or axis of the radial cylinders. Each of the cylinders is provided with an inner piston 12 having a connecting rod 13. The inner end of the connecting rod is arranged between a pair of disks 14 loosely mounted on the inner crank shaft. The connecting rod is secured to the disks or collars 14 by means of pins 15. It will be apparent that when suitable driving power is provided the engine cylinders will travel through individual orbits, the movement of the cylinders being determined by the degree of eccentricity of the axis of the cylinder block with respect to the main shaft. The inner pistons complete two cycles or an inward and outward stroke upon each revolution of the main shaft.

To maintain each of the connecting rods 13 within the axis of its respective cylinder, I provide internal gears 16 carried by the eccentrics 9 and 10. These gears may be formed integral with the eccentrics or secured in position by any suitable means. The collars 14 are carried by a sleeve 16' which surrounds the inner crank shaft and the ends of this sleeve are provided with pinions 17. A pinion 18 is mounted on a pin or shaft 19 carrier by the eccentric and this pinion is adapted to mesh with the internal gear 16 and the pinion 17. The shaft 11 rotates about the main shaft as an axis, but does not revolve on its own axis. It will be apparent that it is necessary for the connecting rods of each cylinder to maintain a definite position, and that the force of the explosion would tend to drive the sleeve 16' and collars 14 around the shaft 11 in the direction in which the force is exerted. However, as the eccentrics and internal gears revolve, pinion 18 is driven, driving the pinion 17 to compensate for the movement of the inner crank shaft and maintain the connecting rods in proper position.

Each of the cylinders is provided with an outer piston 20. These pistons are connected to outer crank shafts 21 by means of connecting rods 22. As shown, one crank shaft is provided for each pair of cylinders and in a construction embodying twelve cylinders, as shown, six crank shafts are provided. The outer crank shafts are driven from the main shaft at one-half the speed of the main shaft by gearing disclosed in detail in Figure 4 of the drawings. As shown, a pinion 23 is arranged on main shaft 6 and this pinion drives a gear 24 and idler ring gear 25. The gear 25 is provided with internal teeth 26 meshing with gear 24 and external teeth 27. The outer crank shafts are provided with pinions 28 adapted to mesh with the external teeth of gear 25. These pinions are provided with the proper number of teeth to drive the outer crank shafts at one-half the speed of the main shaft so that the main shaft makes two revolutions to each revolution of the outer crank shafts. The outer crank shafts are mounted in suitable bearings formed in the outer casing (not shown) and bearings 29 carried by an annular projection or rib 30 secured to the casing. Each of the outer crank shafts is provided with a pair of off-set portions or cranks 31 and 32 and the connecting rods 22 of a pair of cylinders are connected to these off-set portions. As shown in Figure 3 of the drawings, the two cranks or off-set portions are arranged at an angle of 180° to each other.

Means for feeding gas to the cylinders and exhausting the waste gases therefrom are as follows:

The gas fed from the carburetor or other source is connected to hollow shaft 5 and this shaft is provided with openings 33 communicating with feed chamber 34. A number of rotary valves 35 are employed, one valve being provided for each pair of cylinders. These valves are connected to the feed chamber by pipes 36. The detail construction of the valve is shown in Figures 8 to 12 of the drawings. Pipe 36 is adapted to communicate with a reduced portion 37 formed at one end of the valve, the reduced portion being in communication with the inlet pipe at all times. A longitudinal port 38 communicates with this reduced portion and conveys the gases to either of the two cylinders. The valve is provided with cut-out portions 39 and 40 communicating with the port 38 and adapted to deliver gases to the inlet openings 41 and 42 of the cylinders. The cut-out portions communicate with the inlet openings during a portion of each revolution of the valve. As shown in Figure 9 of the drawings, the cut-out portion 40 is in communication with inlet port 41 and cut-out portion 39 is out of communication with inlet port 42 due to lateral shifting of the valve. When the valve is shifted to the left the inlet of gases to the cylinder at the right is interrupted and cut-out portion 39 is brought into communication with the inlet 42 of the cylinder to the left.

The valve is also provided with means for exhausting gases from the two cylinders through exhaust ports 43 and 44. These exhaust ports are adapted to communicate with cut-out portions 45 and 46 arranged in the valve and communicating with a longitudinal port 47. Longitudinal port 47 is in communication with a reduced portion 48 at the end of the valve and this reduced portion communicates with an outlet pipe 49. These outlet pipes communicate with an exhaust chamber 50 surrounding the main shaft 6. As shown the main shaft is provided with openings 51 which permit the exhaust gases to pass into the shaft and through it to a suitable source of disposal. As shown in Figure 9 of the drawings, the cut-out portion 45 is in lateral alinement with the exhaust port 43 and exhaust port 44 and cut-out portion 46 are out of alinement. The valve is adapted to be shifted laterally at each half revolution and is further adapted to revolve at the same speed as the main crank shaft.

The means for shifting and driving the valve are shown in detail in Figure 7 of the drawings. A cam 52 is mounted on the main shaft, the cam being provided with a central opening surrounded by a hub 53 arranged at an angle whereby the cam is maintained at an inclined position. A pinion 54 is arranged on the drive shaft adjacent the cam and is adapted to mesh with pinions 55 carried by suitable shafts 56 projecting from the face of the cam. A ring gear 57 is secured to the face of the cam and is provided with teeth 58 meshing with gears 55. The number of teeth 58 is twice the number of teeth provided on pinion 54 so that the cam is driven at one-half the speed of the drive shaft. The periphery of the cam rides in rollers 59 on shafts 60 to which the valves are attached. By inspection of Figure 3 of the drawings, it will be seen that the valves are shifted laterally as the cam revolves. The valve is rotated by the local rotation of the cylinder block 7. The rods 60 to which the rollers 59 are attached are provided with crank portions 61. The main portion of these rods are mounted in suitable bearings 62 formed in a plate 63 disposed adjacent the cam. As shown, this plate is provided with arms 64 adapted to be secured to the casing. The movement of the cylinder block 7 causes the valve and crank 61 to rotate at the same speed. However, during one-half of each revolution the cut-out portions of the valve are out of communication with the inlet and exhaust ports of any group of cylinders and thus the result produced is the same as in the ordinary four cycle engine provided with the rotary valve geared at one-half the speed of the main shaft.

The cooling fluid is delivered through the pipe 65 which communicates with one of the valve casings through an opening 66. This opening is arranged substantially in the center of the valve longitudinally and the valve is provided with a reduced portion 67 communicating therewith at all times. The opening 67 is in communication with longitudinal port 68 extending through the body of the valve and is also in communication with the interior of the cylinder block through an opening 69. The water chamber 70 of the cylinder block communicates with each of the valves through opening 69 to deliver the cooling medium thereto. The outer valve casing is provided with an extension 71 arranged substantially centrally thereof adjacent the reduced portion 67 of the valve body. This extension is provided with an opening communicating with an elbow 72. As shown the lower end of the elbow is provided with a flange 73 having suitable openings for the reception of fastening elements. The elbow 72 communicates with a pipe 74 which in turn communicates with a fitting 75. As shown, the fitting is provided with parallel end portions connected by a curved central portion 76 (see Figure 13). The opposite end of this fitting is connected to a pipe 77 which passes through the outer casing. The ends of the fitting may be provided with suitable packing 78 retained in place by packing nuts 79. The fitting 75 connects the outer section 77 of the pipe with the inner section 74 by a swiveled connection permitting the inner end 74 to rotate with the cylinder block while the outer end remains stationary. The inlet pipe 65 is provided with a similar connection (not shown).

The ignition system and control are as follows:

Spark plugs 80 are arranged in the inlet chambers 81 of each of the cylinders and a conductor ring 82 is arranged in the casing. This ring is insulated from the engine parts and casing. It is mounted on supports 83 formed of suitable insulating material and retained in place by pins 84. A spring contact 85 is arranged at suitable intervals on the conductor ring. Each of the outer cranks carries a contact member 86 in the form of a link connected to the spark plug by a second link 87. When the crank portion 31 or 32 of the outer crank shaft is in its lowermost position contact member 86 engages the spring contact 85 of the conductor ring to energize the spark plug. The upward movement of the crank portion breaks the connection.

The engine is provided with a starting shaft 88 having sprockets 89. The main shaft is provided with sprockets 90 which are connected to the sprockets 89 by chains 91. To start the engine, shaft 88 is revolved by a hand crank, electric self-starter or other apparatus. The starting shaft may be provided with suitable roller bearings 92 and the main shaft may be provided with similar bearings 93. A fly wheel 94 is mounted on the main shaft, the fly wheel being provided with a weight 95.

As shown in Figures 16 and 17 of the drawings, the motor is provided with a special type of support. As stated, the casing is supported from the end beams 3 by springs 4. Rigidly secured to the end beams are a pair of transverse supports 96 forming a skeleton frame therewith. The starting shaft is supported in bearings 97 carried by these transverse beams. When the motor is used in a vehicle and this particular type of mounting is employed the entire motor is permitted to rock about the shaft 88. The shaft 88 may be a starting shaft as stated, or a drive shaft, or it may serve the functions of both a starting shaft and drive shaft. With such mounting greater flexibility is obtained, and if the throttle valve of the carburetor is suddenly opened the motor will rotate about shaft 88 in a small arc compressing one of the springs 4 and stretching the other spring. The shocks and jars resulting from sudden opening of the throttle or other unevenness in running are taken up by the springs 4 saving wear and tear on the moving parts of the motor and drive connections to the vehicle wheels.

The operation of the engine is as follows:

The engine is of the four cycle type and the inner crank shafts make two revolutions to each explosion of the cylinder. As twelve cylinders are provided in this embodiment there will be six explosions to each revolution of the inner crank shafts or an explosion every sixty degrees. The gas is admitted to the cylinder from chamber 34 through pipe 36 and valve 35. At the beginning of the inlet stroke in any given cylinder the crank portion 31 or 32 is starting downwardly and the inner connecting rod 13 is moving toward the inner end of the cylinder. During the inlet stroke the inner piston moves to its outermost position and the outer piston moves one-half this distance. During the compression stroke the outer piston continues to move outwardly but the inner piston moves inwardly at twice the speed and through a longer stroke. This causes compression to take place in the cylinder, the position of the pistons at the end of the compression stroke being indicated at 98 in Figure 4 of the drawings. After the explosion, the inner piston 12 is moved outwardly by the force of the explosion but the piston 20 continues to moves inwardly toward the center of the cylinder. Due to the fact that the piston 12 makes two complete strokes to each stroke of piston 20 and to the fact that the stroke of the inner piston is longer, the distance between the piston increases during the outward stroke of piston 12. The power stroke is illustrated in subviews 2 to 5 of Figure 15. In subview 5 the piston 12 has completed its outward stroke and is beginning to move toward the center of the cylinder. In the mean time piston 20 has moved one-half the distance toward the center and continues to move inwardly. Subviews 6, 7 and 8 illustrate the movement of the pistons during the exhaust stroke. When the pistons reach their innermost positions as illustrated in subview 1, Figure 15ª, the exhaust stroke is completed. It will be noted that although the connecting rods 13 and 17 are in the same position in this figure as in Figure 15, subview 1, the position of the pistons differ. During the interval that lapses between the time indicated by Figure 15, subview 1, and Figure 15ª, subview 1, crank shaft 16 has completed one-half of a revolution and the crank portion 31 or 32 has moved from its lowermost position to its uppermost position changing the position of the outer piston. Subviews 2 to 5 of Figure 15ª, illustrate the inlet stroke. During this stroke piston 12 is moving toward the inner end of the cylinder and piston 20 is moving in the opposite direction toward the other end of the cylinder. Subview 5 illustrates the position of the pistons at the end of the inlet stroke, the piston 12 having moved to its extreme outer position and the piston 15 half way toward its outer position. During the compression stroke piston 12 moves toward the center of the cylinder and piston 15 continues to move outwardly. Due to the difference of speed and the difference of the stroke of the two pistons the space between the two pistons decreases, causing compression. When the cycle is completed the two pistons are in the position shown in subview 1 of Figure 15, at the end of the compression stroke and just before the explosion. As the crank shaft 16 has completed one-half a revolution since the end of the exhaust stroke, either crank portion 31 or 32 is in its lowermost position and the pistons are spaced sufficiently to allow room for the compressed gases.

In the form shown, the cylinder is provided with a pair of conductor rings 82, one for each set of cylinders. Six spring contact clips 85 are provided on each conductor ring, one for each cylinder of each set. The conductor ring may be rotated by any rotating means (not shown) to advance or retard the spark. The off-set or crank portions 31 or 32 of the outer crank shafts are placed one-sixth of a revolution in advance of the succeeding shafts thus making electrical contact for one cylinder every 60° of a revolution.

During the time that one set of cylinders are exploding charges of the mixture and exhausting the burnt gases as represented in Figure 15 the corresponding cylinders of the other set are on the inlet and compression strokes as illustrated in Figure 15ª. This is brought about by lateral shifting of the valves 35. The valves are so arranged that they will be shifted at the completion of the inlet stroke to bring the exhaust and inlet ports of the cylinders out of alinement with the corresponding parts of the valve. During the revolution that the ports are not registering the compression and explosion strokes occur. At the end of the explosion stroke the valve is again shifted laterally, and due to its rotation, the exhaust outlet is in communication with the exhaust port of the cylinder. At the end of the exhaust stroke the lateral position of the valve remains unchanged but the rotation of the valve brings the exhaust port out of communication with the exhaust outlet. At this time the inlet in the valve communicated with the inlet opening in the cylinder and these two ports remain in communication during the inlet stroke. At the end of the inlet stroke, the valve is again shifted laterally as described.

The cooling medium is delivered to the lower portion of the motor through the pipes 65, flows through the cooling chamber 70 of the cylinder block, and the ports 68 of the valves, being delivered toward the top of the motor due to its increase in temperature and passing out through the elbow 72 to the outlet pipe 74.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An internal combustion engine comprising a main shaft, a plurality of cylinders radially disposed eccentric to said main shaft and connected thereto whereby each of said cylinders travels in an orbit, an inner and outer piston in each of said cylinders, an inner crank shaft to which said pistons are connected, and a plurality of outer crank shafts to which said outer pistons are connected.

2. An internal combustion engine comprising a main shaft, a plurality of cylinders radially disposed eccentric to said shaft and connected thereto whereby each of said cylinders travels in an orbit, an inner and outer piston in each of said cylinders, an inner crank shaft to which said inner pistons are connected, and a plurality of outer crank shafts to which said outer pistons are connected, said outer crank shafts being adapted to revolve at one-half the speed of the main crank shaft.

3. An internal combustion engine comprising a main shaft, a plurality of radially disposed cylinders eccentric to said shaft and connected thereto whereby each of said cylinders travels in an orbit, pistons arranged in said cylinders, crank shafts connected to said pistons and to said main shaft, a spark plug in each cylinder, an annular conductor arranged near said cylinder, and spaced contacts adapted to be closed by said crank shafts.

4. An internal combustion engine comprising a main shaft, a plurality of radially disposed cylinders arranged in pairs, said cylinders being eccentric to said shaft and connected thereto whereby each of said cylinders travels in an orbit, laterally movable valves controlling the inlet and exhaust of said cylinders, each of said valves being arranged to control the inlet and exhaust from two cylinders forming a pair, and operating means for said valve.

5. An internal combustion engine comprising a main shaft, a plurality of radially disposed cylinders said cylinders being eccentric to said shaft and arranged in pairs, the two cylinders forming a pair being arranged adjacent each other, a rotary valve controlling the inlet and exhaust of each pair of cylinders, and means for shifting said valve laterally to permit exhaust and inlet to one cylinder and prevent exhaust and inlet to the other cylinder.

6. An internal combustion engine comprising a main shaft, a plurality of radially disposed cylinders eccentric to said main shaft, pistons arranged in said cylinders, crank shafts connected to said pistons and to said main shaft, a spark plug in each of said cylinders, an annular conductor arranged near said cylinder, a contact member carried by said conductor, and a second contact member carried by each of said crank shafts adapted to close an electric circuit to energize said spark plugs by the revolution of the crank shaft.

7. An internal combustion engine comprising a main shaft, a plurality of radially disposed cylinders said cylinders being eccentric to said shaft and arranged in pairs, the two cylinders forming a pair being arranged adjacent each other, a rotary valve controlling the inlet and exhaust of each pair of cylinders, and a cam for shifting said valve laterally to permit inlet and exhaust of gases from one cylinder and prevent inlet and exhaust of gases from the other cylinder.

8. An internal combustion engine comprising a main shaft, a plurality of radially disposed cylinders eccentric to said main shaft, an inner and outer piston in each of said cylinders, an inner crank shaft to which said inner pistons are connected, said shaft being connected to the main shaft and revolving at the same speed, a plurality of outer crank shafts to which said outer pistons are connected, said outer crank shafts being connected to the main shaft by gearing, and being adapted to revolve at one-half the speed of the main shaft.

9. An internal combustion engine comprising a main shaft, a plurality of radially disposed cylinders eccentric to said main shaft and connected thereto, an inner and outer piston in each of said cylinders, an inner crank shaft to which said inner pistons are connected, said shaft being connected to the main shaft and revolving at the same speed, a plurality of outer shafts to which said outer pistons are connected, said outer shafts revolving at one-half the speed of the main shaft, and crank portions formed on said outer shafts to permit reciprocation of the outer pistons, said outer pistons being positioned at their innermost position at the end of the exhaust stroke to effect scavenging.

10. An internal combustion engine comprising a main shaft, a plurality of radially disposed cylinders eccentric to said main shaft, inner and outer pistons in each of said cylinders, an inner crank shaft to which said inner pistons are connected, a plurality of outer crank shafts to which said outer pistons are connected, said outer crank shafts being adapted to revolve at one-half the speed of the inner crank shaft, the revolving of the outer crank shafts being adapted to alter the position of reciprocation of the outer piston.

11. The combination with an engine comprising a plurality of radially disposed cylinders, a casing, a main shaft journaled in said casing and connected to said cylinders, an auxiliary shaft extending through said casing and flexibly connected to said main shaft, of a support therefore comprising a rigid frame, said auxiliary shaft being mounted in bearings on said frame, and springs arranged between said frame and said casing.

12. An internal combustion engine comprising a main shaft, a plurality of radially disposed cylinders, said cylinders being eccentric to said shaft and arranged in pairs, laterally movable valves controlling the inlet and exhaust of said cylinders, each of said valves being arranged to control the inlet and exhaust from two cylinders forming a pair, operating means for said valves, means for circulating a cooling fluid around said cylinder, and means for passing said cooling fluid through said valves.

In testimony whereof I affix my signature.

MANNING GOLDSMITH.